Jan. 24, 1939.  W. B. BARNES  2,144,789
OVERSPEED DRIVE TRANSMISSION
Filed Jan. 23, 1935  2 Sheets-Sheet 1
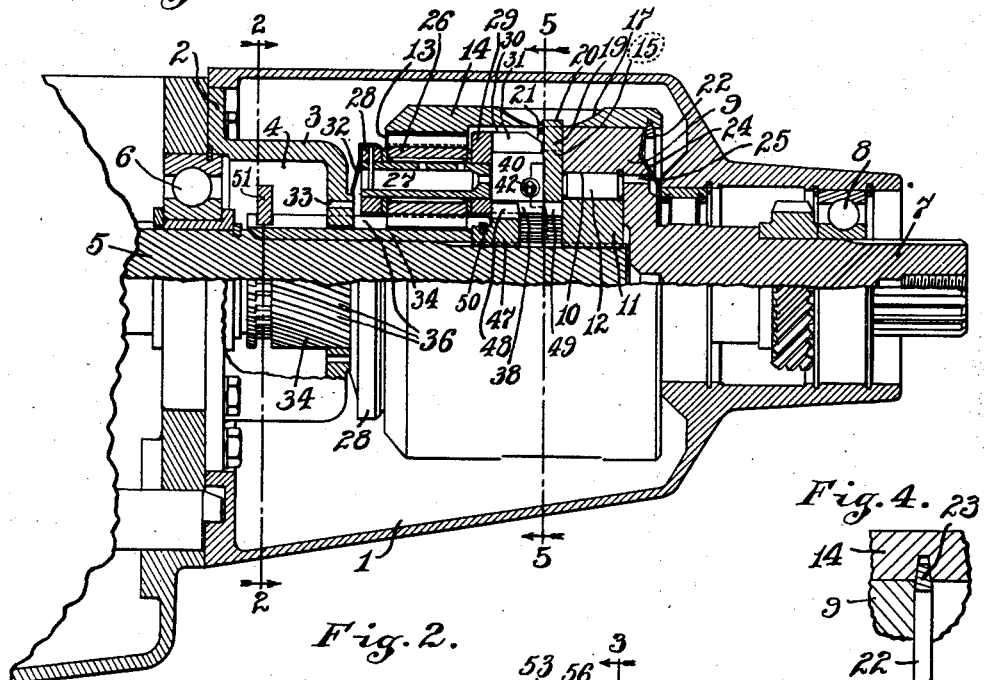
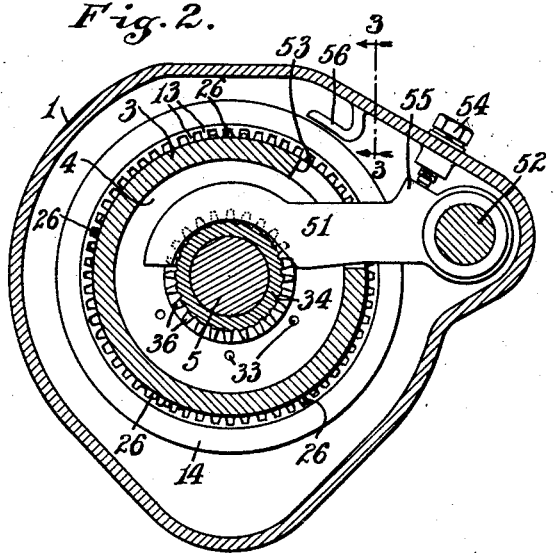
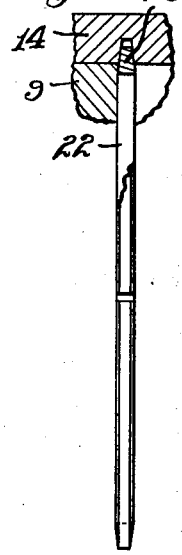
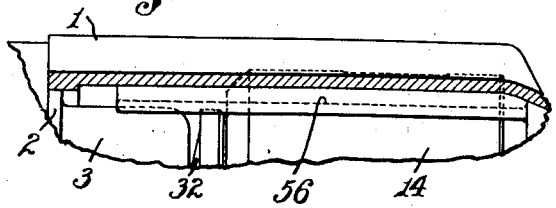
INVENTOR
William B. Barnes,
BY
Hood + Hahn
ATTORNEYS

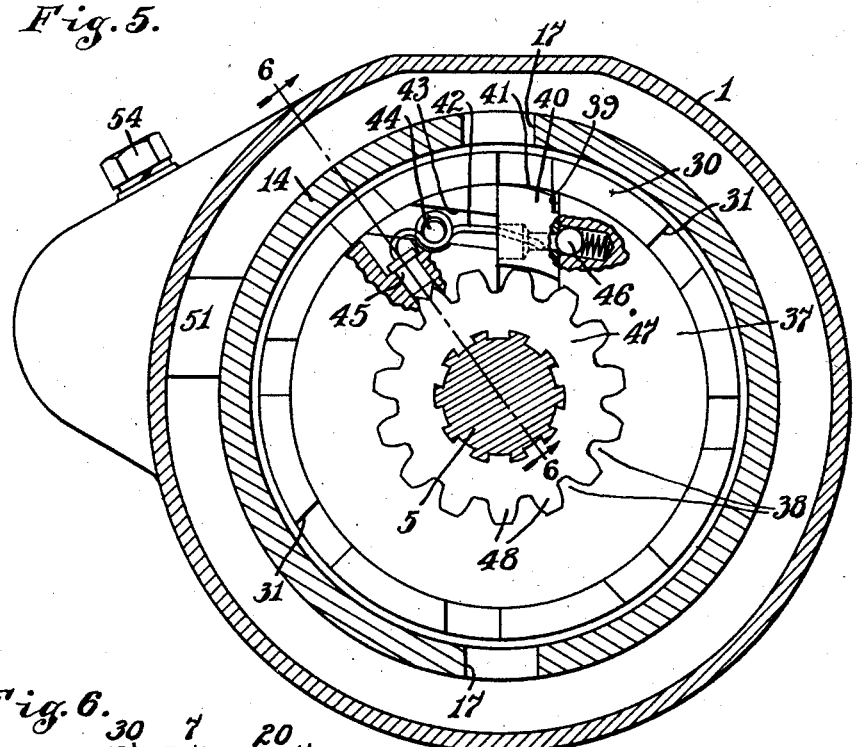

Patented Jan. 24, 1939

2,144,789

UNITED STATES PATENT OFFICE 2,144,789

OVERSPEED DRIVE TRANSMISSION

William B. Barnes, Indianapolis, Ind., assignor to Barnes Motor Developments Company, Muncie, Ind., a partnership composed of said William B. Barnes and Freda Arthur Barnes Application January 23, 1935, Serial No. 3,019

10 Claims. (Cl. 74—260)

My invention relates to improvements in gearing and primarily in overspeed gearings particularly adapted for use in automobiles. It has for one of its objects the provision of an overspeed transmission for automobiles which may be used in conjunction with the regular three-speed forward and one-speed reverse transmissions now in use, which overspeed transmission is so constructed that the cost of manufacture will be reduced to the minimum; the parts being so constructed and arranged that they may be manufactured at a minimum cost and may be assembled with a minimum expenditure of time.

Another object of my invention is to provide an overspeed drive having automatic means for operatively relating the overspeed drive transmission with the driving and driven shafts which overspeed drive is thrown in operative relation in accordance with the speed at which the vehicle is traveling and to provide means whereby this operative relation may take place at more than one selected speed.

For the purpose of disclosing my invention I have illustrated certain embodiments thereof in the accompanying drawings, in which—

Fig. 1 is a longitudinal sectional view of a transmission embodying my invention;

Fig. 2 is a sectional view taken on the line 2—2 of Fig. 1;

Fig. 3 is a detail sectional view taken on the line 3—3 of Fig. 2;

Fig. 4 is an enlarged detail sectional view showing a means for holding certain parts in assembled relation;

Fig. 5 is a sectional view taken on the line 5—5 of Fig. 1;

Fig. 6 is a detail sectional view taken on the line 6—6 of Fig. 5;

Fig. 7 is a detail sectional view taken on the line 7—7 of Fig. 6;

Fig. 8 is a plan view of a modified form of one of the members of the automatic clutch; and Fig. 9 is a detail transverse sectional view of the structure illustrated in Fig. 8.

In the embodiment of the invention illustrated, the overspeed transmission is mounted in a suitable casing 1, the front end 2 of which is adapted to be secured to the rear wall of the standard transmission casing. This front wall 2 abuts against the rear wall of the standard transmission and is provided with an internally extending annular boss hub 3 forming an oil chamber 4 which will be closed to a large extent by the rear wall of the standard transmission casing. The, what may be termed, driving shaft 5 of the overspeed transmission extends through this boss hub 3 and through the rear wall of the transmission casing, being supported in position by suitable ball bearings 6 formed in the rear wall of the standard casing. The driven shaft 7 extends through the rear wall of the casing 1 and is supported by suitable ball bearings 8 in the overspeed casing. This driven shaft 7 is provided at its forward end with an enlarged head 9 adapted to overhang the end of the shaft 7 and provided on its inner periphery with one surface 10 of an overrunning clutch. The opposite member 11 of this overrunning clutch is keyed to the end of the driving shaft 5 and is provided with the usual cammed surfaces of this type of clutch between which and the surface 10 are interposed suitable rollers 12.

The overspeed drive in this particular instance, comprises a planetary gear structure, the ring gear 13 of which is formed on the inner periphery of a hollow sleeve 14 fitting over, at its rear end, the head 9. This head 9 is provided with an annular flange 15 on its forward face in which are formed radial notches 16. The sleeve 14 is provided with coinciding openings 17 preferably formed by a milling cutter, and the sleeve and head are locked together by a locking plate or disc 19. This disc at its outer periphery is provided with radial ears 20 adapted to extend through the notches 16 and into the openings 17. In assembling the disc or plate 19 with the sleeve 14, the disc is inserted in the sleeve, with the sleeve removed from the head 9, in a slightly tilted position and one of the ears is inserted in one of the openings 17. The plate is then moved toward the perpendicular with one of the ears projecting through one of the openings 17 until the other ear clears the inner periphery of the sleeve. The plate then may be dropped slightly to engage the opposite ear in the openings 17 in the sleeve. The whole structure then is assembled on the head 9 and the ears enter the notches 16 with the periphery proper of the plate fitting within the annular flange 15 so that the plate is held within this annular flange against displacement transversely to its axis. The plate and sleeve and head are then locked together by means of a split ring 21 fitting in an annular groove in the sleeve 14 and abutting the plate 19 and by a second split ring 22 fitting in an annular groove at the end of the sleeve and abutting the rear face of the head 9. This split ring 22 is of peculiar construction in cross section and, as illustrated more particularly in Fig. 4, is wedge-shaped as shown at 23. When the split ring is inserted in its annular groove it may be forcibly spread forcing the wedge-shape portion in the groove and, by this wedge-shape tightening up, the above-mentioned assembled parts to hold the same against any play.

Before assembling the ring 23 I preferably arrange on the head 9 an annular disc 24, preferably formed of sheet metal, having a center opening therein which disc is clamped between the ring 23 and the head 9. This disc overhangs suitable oil openings 25 in the head and provides a means for directing lubricating oil into the overrunning clutch.

The planetary pinions 26 cooperating with the ring gear are mounted on suitable spindles 27 provided with needle bearings and these spindles are supported in the pinion carrier cage comprising a ring 28 at one end and a second ring 29 at the opposite end; this second ring being provided with an annular flange 30 forming one member of an automatic clutch and provided with a plurality of dog-receiving notches 31.

The member or ring 28 is provided with a sheet metal oil deflecting disc 32 which surrounds an annular flange on the hub member 3 and is adapted to receive oil from the oil chamber 4 through suitable openings 33 for the purpose of deflecting lubricating oil to the bearings of the pinions 26.

The sun gear 34 of the planetary gearing surrounds the driving shaft 5 and is provided on its outer periphery with teeth 36 which are not only engaged by the teeth of the planet pinions, but also engage internal teeth on the hub boss 3 to hold the sun gear against rotation, although the sun gear is permitted a certain amount of axial movement, the purpose of which will appear more fully hereinafter. The opposite member of the automatic clutch which has been rather aptly termed the core member or core 37 fits within the annular flange 30 and is provided with internal teeth 38. This core is also provided on its face with a radial slot 39 adapted to receive a radial movable centrifically operated dog 40; the top or outer face of which is cammed somewhat as at 41 so that the dog will not engage in any one of the slots 31 until the core 37 and ring member of the clutch 29 are rotating in synchronism. This dog 40 is adapted to be moved radially under the influence of centrifugal force and is restrained in its radial movement by means of a spring 42 preferably lying in a recess 43 in the front face of the core and having a coil surrounding a pin 44. The opposite end of the spring bears upon a radially movable pin 45 which is adapted to project to the interior of the core. The dog 40 is also restrained somewhat in its retracted position by a suitable spring operated detent 46.

In order to establish direct drive between the shafts 5 and 7 or to place the automatic clutch in operative relation with the parts, an axially movable clutch member 47 is splined on the shaft 1 and the radial teeth 48 thereon are adapted to be moved either into engagement with internal teeth 49 formed on the plate 19, which, it will be remembered, is locked to the head 9, or with the internal teeth 38 alone on the core 37. This lockup member 47 is moved axially by moving the sun gear 34 and to this end the teeth 36 of this sun gear project beyond the end of the hub of the gear, being provided on their internal portions with an annular groove adapted to receive a split ring 50 also engaging in an annular groove on the hub of the lockup member 47. By this arrangement, while the lockup member 47 is locked to the sun gear to be moved axially therewith, it can rotate relatively to the sun gear.

In its rearmost position, that is, in its position where the teeth 48 of the lockup member 47 engage with the teeth 49, a direct drive is established. When the lockup member 47 is moved to the left, looking at Fig. 1, a portion of its distance that is sufficient to clear the teeth 49, the core 37 is locked to the driving shaft 5 and the teeth 48 are in a position to engage and move the pin 45 radially outwardly, thereby increasing the tension of the spring 42 and the restraining influence on the dog 40 so that the dog will not move out readily under the influence of centrifugal force. In actual practice, the tension of this spring under these circumstances is figured to restrain the dog in position until the automobile is traveling at the rate of about 55 or 60 miles an hour, at which time the spring will permit the dog 40 to move outwardly under the influence of centrifugal force. If the lockup member 47 is moved further to the left, looking at Fig. 1, until the teeth thereof have moved from beneath the pin 45 permitting the pin to move inwardly, the tension of the spring 42 is reduced so that the dog 40 will move outwardly at a much lower speed, say when the automobile is traveling at about 30 or 35 miles an hour.

The shifting of the sun gear to in turn shift the lockup member 47, is accomplished through the medium of a shift fork 51 slidably mounted on a rod 52 arranged in the casing at one side of the transmission and engaging in a notch at the end of the sun gear. This shift fork extends through an enlarged opening 53 formed in one side of the boss hub 3 and this opening is sufficiently large to permit the rotating of the fork on the rod 52 to disengage the same from the sun gear. After the parts have been assembled, the fork is held against rotative movement on its rod 52 by means of an adjustable screw 54 engaging an elongated boss 55 on the fork.

The opening 53 also provides an oil receiving opening into which oil is dumped from the internal longitudinally extending oil trough 56 formed on the inside of the casing and extending substantially the entire length. Oil, which is maintained in the casing, is thrown off, by the centrifugal force, when the parts are rotating, into this trough 56 and flows down the trough to the delivery end thereof from whence it dumps from the end into the oil chamber 4 and thence through the openings 33 behind the shield 32 to be moved to the outer periphery of the shield under centrifugal force and forced into the bearings of the pinions.

In order to still further cheapen the cost of construction of the structure I may, if desired, instead of milling a groove or recess 39 in the front face of the core member, cut a groove 57 clear through the core, as illustrated in Figs. 8 and 9. In other words, the core would be a split member. This groove would provide a recess for the dog 40 and the structure would not be unnecessarily weakened due to this form of construction because it will be remembered that the core is arranged within the annular flange 30 so that any tendency to spread, under high speed, on the part of the split core, would be restrained by the flange.

In order to further cheapen the cost of construction the core is provided with an annular groove 58 therein and a restraining spring 59 is arranged within this groove; being wrapped around a pin 60 extending through the walls of the groove and having one end engaging the dog 40. The opposite end bears on the bottom of the groove 58. This spring serves the function of a restraining spring at comparatively low speed. That is, it will not restrain the dog in its retracted position when the automobile is moving say at 30 or 35 miles an hour. A second restraining spring 61, wrapped around a pin 62, is inserted in the groove and while one end of this spring engages the dog 40 the opposite end bears upon a radially movable pin 63 similar to the pin 45. When this pin is in its retracted position no tension is placed upon the spring 61. As soon, however, as the pin 63 is moved outwardly, in a manner similar to that of pin 45, this spring is placed under tension and together with the spring 59, serves to restrain the dog against radial movement under the influence of centrifugal force until the automobile is traveling say above a speed of 55 or 60 miles an hour.

It will be understood of course that the above speeds are purely arbitrary and that any speed at which the dog will move outwardly may be selected, depending upon the tension of the spring.

In operation, as has been heretofore explained, when the shaft 5 is directly locked to the shaft 7 by moving the teeth 48 into engagement with the teeth 49, that is, by moving the lockup member 47 to its extreme limit to the right, looking at Fig. 1, a direct drive is established and the overspeed drive is inoperative. As soon as the lockup member 47 is shifted to the left, looking at Fig. 1, and out of engagement with the teeth 49, the automatic clutch is placed in operative relation and when the speed of the shaft 5 reaches the critical speed, at which the dog 40 will throw out under centrifugal force, the dog 40 will move outwardly, under centrifugal force, into a position to engage in one of the notches 31. Due, however, to the fact that under these circumstances, the core 37 is moving faster than the sleeve member of the clutch, the dog 40 will ratchet past the recesses and will not engage. In order to cause an engagement, the operator of the vehicle, by slowing down the speed of the shaft 5, as for instance removing his foot from the accelerator for a short period, permits the speed of the shaft 5 to be reduced to the point where the outer and inner members of the clutch are rotating in synchronism and the dog will then immediately engage. Then, by increasing the speed of the shaft the driven shaft will be operated through the medium of the overspeed planetary gearing.

I claim as my invention:

1. The combination with a driving and a driven shaft, of speed-changing gearing for driving said driven shaft at a different speed from that of the driving shaft, an automatic centrifugally operated clutch for connecting said shafts through said gearing, including members movable into operative position under the influence of centrifugal force, means for retracting said members until the rotational speed thereof reaches a predetermined point, means for varying the retractive force of said retractive means, shiftable means for selectively establishing a direct drive between said shafts or drivingly connecting one of said shafts with one of the members of said clutch, said shiftable means being also operable to operate said retractive force varying means to selectively determine the speed at which the members of said clutch will engage to establish driving relation between said shafts through said gearing.

2. The combination with a driving shaft and a driven shaft, of a planetary gearing for driving the driven shaft at a different speed from that of the driving shaft, including a ring gear connected to one of said shafts, a sun gear surrounding the axes of said shafts and axially movable, planet pinions interposed between said sun and ring gears, an automatic centrifugally operated clutch for establishing driving relation between said shafts through said planetary gearing, an axially shiftable member for selectively establishing a direct drive between said shafts or for connecting one of the members of said clutch to one of said shafts, whereby a drive may be established between said shafts through said planetary gearing and means for shifting said member through the axial shifting of said sun gear.

3. The combination with a driving shaft and a driven shaft, of a planetary gearing for driving said driven shaft at a different speed from that of the driving shaft, including a ring gear connected to one of said shafts, an axially shiftable sun gear surrounding the axes of said shafts, planet pinions interposed between said ring and sun gear, a pinion carrier including a ring member having an annular flange, said flange being provided with dog-engaging recesses of a clutch member, a second clutch member provided with a radially movable dog adapted to move into engaging position under the influence of centrifugal force, an axially movable member for selectively connecting said shafts for a direct drive or for connecting said dog-carrying member with one of said shafts, and means for connecting said member to said sun gear to permit the axial shifting of said member through the instrumentality of said sun gear.

4. The combination with a driving shaft and a driven shaft, of a planetary gearing for drivingly connecting said shafts, one of said shafts having an enlarged annular head, a ring gear comprising a sleeve adapted at one end to fit over said head and at the other end being provided with ring gear teeth, openings in said ring sleeve, an annular flange formed on said head having notches therein coinciding with the openings in said sleeve, a ring fitting within said annular flange on said head and lugs on said ring engaging said notches and projecting into the openings in said sleeve for locking said sleeve to said head, a sun gear surrounding the axes of said shafts, planet pinions interposed between said sun gear and said ring gear, a planet gear carrier for said pinions and means for connecting said carrier to one of said shafts.

5. The combination with a driving and a driven shaft, of a planetary gearing for drivingly connecting said shafts including a ring gear, said ring gear comprising a sleeve adapted at one end to surround one of said shafts, a locking plate connected to the face of one of said shafts and adapted to engage said ring gear for locking the two together, an abutment ring for preventing relative axial movement between said ring gear and said shaft, and a second abutment ring wedge shaped in cross section adapted to be received in a groove in said ring gear and engage an abutment on said shaft for cooperating with said shaft abutment to lock said ring gear against axial movement on said shaft.

6. The combination with a driving shaft and a driven shaft, an annular head on one of said shafts having an annular flange thereon provided with notches therein, a sleeve surrounding said head at one end and having at its opposite end ring gear teeth, said sleeve being provided with openings adapted to coincide with the notches in said annular flange, a ring plate having a central opening therein provided with internal teeth fitting within said annular flange, lugs on said ring plate engaging in the notches in said flange and entering the openings in said sleeve for rotatively locking said sleeve to said head, a sun gear surrounding the axis of said shafts, a planet carrier and planet pinions mounted in said carrier and interposed between said ring gear teeth and said sun gear, and an axially shiftable toothed member rotatively fixed on one of said shafts and movable in one position into engagement with the teeth of said plate ring for establishing a direct drive between said shafts and movable into another position to provide for the connection of said planet carrier with one of said shafts to establish a drive between said shafts through said planetary gearing.

7. The combination with a driving shaft and a driven shaft, of a speed changing gearing for driving said driven shaft at a different speed from that of the driving shaft, an automatic clutch for establishing driving relation between said shafts through said gearing comprising a ring member having openings therein, a core member fitting within said ring having a notch extending from face to face of said member and radially inwardly from the outer periphery thereof, and a radially slidable dog mounted in said notch and adapted to be moved under the action of centrifugal force into engagement with the recesses in said ring member.

8. The combination with a driving shaft and a driven shaft, of a speed changing gearing for driving said driven shaft at a different speed from that of the driving shaft, a centrifugally operated clutch for establishing driving relation between said shafts when the speed of one of said shafts reaches a predetermined point, comprising a ring member having dog-engaged openings therein, a core member comprising a split ring fitting within said ring member and having a central opening therein provided with teeth, a radially movable dog mounted between the split ends of said ring and movable under centrifugal force to engage in the recesses in said ring and means connected to one of said shafts and movable into engagement with the internal teeth of said split ring for connecting said ring to one of said shafts.

9. The combination with a casing having at one end an inwardly extending hollow hub, a shaft projecting into said casing, a second shaft extending into said casing in axial alignment with said first-mentioned shaft, a planetary gear in said casing for drivingly connecting said shafts and including a ring gear, a sun gear and planet gears, a ring connected to the pinions of said planet gears, an oil deflector ring overhanging the pinions of said planet gears mounted on said ring, a trough extending lengthwise of the inner wall of said casing and terminating adjacent an opening in said hub, and discharge openings in said hub terminating within said deflecting ring, whereby lubricating oil will be thrown by centrifugal force into said trough and delivered into said hollow hub and from thence be delivered within said deflecting ring.

10. In a motor vehicle drive, driving and driven aligned shafts, a fixed sun gear, a cylindrical member having an internal gear, a planetary gear meshing with said sun and internal gears and having a carrier, clutch means for drivingly connecting said driving shaft to said carrier, an extension member drivingly carried by said driven shaft, one of said members having a slot, the other of said members having a projection engaged in said slot to drivingly connect said members.

WILLIAM B. BARNES.